US 7,114,164 B2

(12) United States Patent
Smith et al.

(10) Patent No.: US 7,114,164 B2
(45) Date of Patent: Sep. 26, 2006

(54) SYSTEMS AND METHODS FOR INJECTING AN EXCEPTION INTO A TARGET THREAD

(75) Inventors: Frederick J. Smith, Redmond, WA (US); Oleg Kagan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 10/455,285

(22) Filed: Jun. 4, 2003

(65) Prior Publication Data

US 2004/0250189 A1 Dec. 9, 2004

(51) Int. Cl.
*G06F 9/48* (2006.01)
(52) U.S. Cl. .................................... 719/318; 714/38
(58) Field of Classification Search ............... 719/318
See application file for complete search history.

(56) References Cited

U.S. PATENT DOCUMENTS

| | | | | |
|---|---|---|---|---|
| 6,202,174 | B1* | 3/2001 | Lee et al. ...................... | 714/38 |
| 6,591,379 | B1* | 7/2003 | LeVine et al. ................ | 714/38 |
| 2004/0003312 | A1* | 1/2004 | Smith ............................ | 714/5 |
| 2004/0117803 | A1* | 6/2004 | Srivastava et al. ........... | 719/318 |
| 2004/0122940 | A1* | 6/2004 | Gibson et al. ................ | 719/318 |
| 2005/0144442 | A1* | 6/2005 | Smith ........................... | 713/164 |

OTHER PUBLICATIONS

Wahbe, R. et al.; Efficient software-based fault isolation; Dec. 1993; ACM SIGOPS Operating Systems Review, Proceedings of the fourteenth ACM symposium on Operating systems principles SOSP '93, vol. 27 Issue 5; pp. 355-364.*
International Business Machines Corp.; Fault Injection Mechanism; Oct. 1998; one page and cover sheet.*
DeNicolao, G. et al., "Stability and Robustness of Nonlinear Receding Horizon Control", *Progress in Systems and Control Theory*, 2000, 3-22.
Gunnarsson, T. et al., "Operations in A-Theory", *Journal of Pure and Applied Algebra*, 2002, 174, 263-301.
Harnad, J. et al., "Classical and Quantum Integrable Systems in $\tilde{gl}(2)+*$ and Separation of Variables", *Commun. Math Phys.*, 1995, 172, 263-285.
Kazerooni, H. et al., "Theory and Experiments on Tracking of the Repetitive Signals", *Proceedings of the American Control Conference*, 1989, 298-303.
Szapudi, I. et al., "Cosmological Perturbation Theory Using the Schrodinger Equation", *The Astrophysical Journal*, 2003, 583(1,2), L1-L4.
Yau, S.S. et al., "Design of Self-Checking Software", *SIGPLAN Notices/ACM Special Interest Group on Programming Languages*, 1975, 10(6), 450-457.

* cited by examiner

*Primary Examiner*—R. Stephen Dildine
(74) *Attorney, Agent, or Firm*—Woodcock Washburn LLP

(57) ABSTRACT

A fault or an exception is injected into a target thread. Instructions are processed and a target thread is recognized. As a result, an asynchronous procedure call is queued. The asynchronous procedure call is run on the target thread and the context of the target thread is modified. The target thread is executed in the modified context and an exception is raised in the target thread as a result of the modified context. The exception is handled and processing of the instruction continues.

35 Claims, 4 Drawing Sheets

SYSTEMS AND METHODS FOR INJECTING AN EXCEPTION INTO A TARGET THREAD

FIELD OF THE INVENTION

The present invention is directed generally to the field of computing. More particularly, the invention is directed to systems and methods for injecting a fault or an exception into a target thread.

BACKGROUND OF THE INVENTION

Infinite loops and deadlocks are reasons that programs and operating systems (OSs) "get stuck" or "hang". It is an especially pervasive and difficult problem when an OS or application is using third party components. In this manner, when third party code is run and acts as part of a program or operating system, then infinite loops in the third party code can "hang" the program or operating system. Typically, when running the third party components, the host has little control or input over the source code of the component and therefore this third party component may be considered "untrusted". In this regard, these components perform intermittently, behaving normally in most circumstances and only occasionally causing a problem to the host.

Exceptions are errors or abnormal situations that occur during the processing of instructions. Typically, such exceptions cause a deviation from the sequence of execution. Once an exception is raised, typically, an exception handler processes the exception. An exception handler is a set of instructions or routines that is invoked when an exception of the appropriate type occurs.

Today it is possible for an exception to be raised in a process thread; however, exceptions can only be raised within the thread as a side effect of something that particular thread does. For example, a thread can try to access memory to which it does not have access and raise a memory management exception, or it can try to divide by zero and raise a division by zero exception. Currently, however, there is a need for systems and methods for raising an exception or injecting an exception in another thread.

SUMMARY OF THE INVENTION

The present invention satisfies the aforementioned need by providing systems and methods for injecting an exception into a target thread In one embodiment of the invention, the target thread may be a stuck or hung thread. By providing systems and methods for injecting exceptions into a target thread that is stuck, the number of "crashes" or "freezes" caused by a spinning thread can be reduced, thereby achieving greater stability of a running operating system or application program and increasing the overall user experience.

The mechanism of injecting an exception into a target thread comprises generating a special exception into a thread of execution such that an effective unwinding of that thread is performed to point where the operating system or application program can process the failure, decide whether recovery is possible and continue execution. Such process avoids a user experienced "freeze" or "crash".

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The invention provides an operating system or application program with the ability to inject an exception into a target thread. In one embodiment of the invention, the target thread is a spinning thread. In this manner, the present invention provides a method for injecting an exception or fault into the spinning or stuck thread such that the operating system or application can recover from a deadlock or loop situation created by the stuck thread. A mechanism of "recovery" in accordance with the present invention includes generating a special exception into the thread of execution of an untrusted component that causes unwinding of the target thread to the point where the application or operating system can process the failure, decide whether recovery is possible and continue execution.

By way of example, the present invention may be used to detect and recover from deadlocks or infinite loops caused by a stuck thread during a hardware device failure, such as those that may occur in display drivers. In this manner, the display driver containing a stuck thread may spin in a busy loop waiting on a hardware bit to change state, or if the hardware state change never occurs, the software may spin forever. By providing a mechanism for injecting an exception into a target thread—in this case a stuck thread—the thread can be unwound and an exception handler can determine how to handle the hung or stuck thread.

The detailed description which follows is represented largely in terms of processes and symbolic representations of operations by conventional computer. The processes and operations performed by the computer include the manipulation of signals by a processor and the maintenance of these signals within data sets or data structures resident in one or more memory storage devices. These symbolic representations are the means used by those skilled in the art of computer programming and computer construction to most effectively convey teachings and discoveries to others skilled in the art. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, nodes, frames, samples, data, entries, objects, images, files or the like. It should be kept in mind, however, that these and similar terms are associated with appropriate physical quantities for computer operations, and that these terms are merely conventional labels applied to physical quantities that exist within and during operation of the computer.

Exemplary Computing Environment

Figure 1:
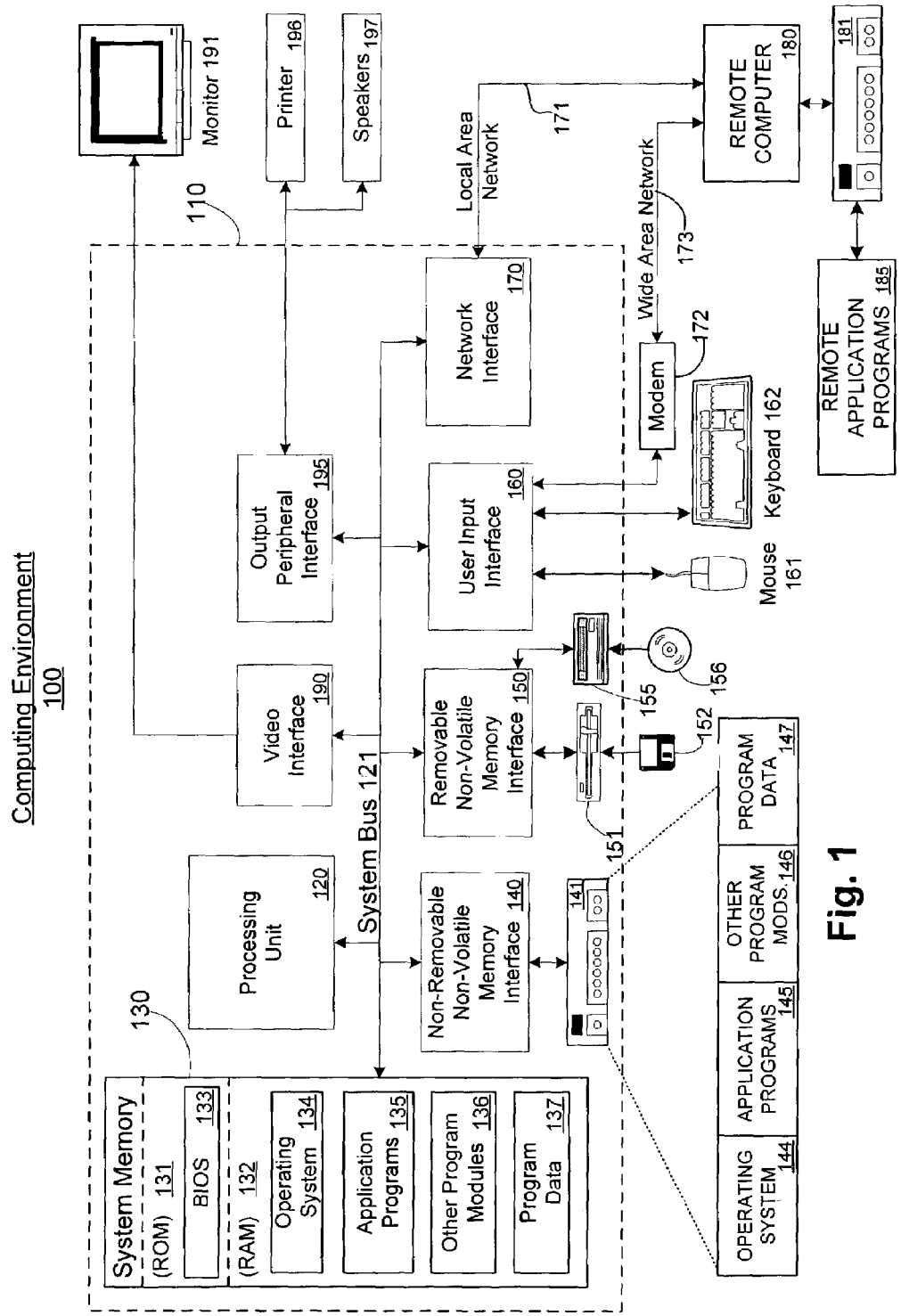
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, DVDs, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

Figure 2:
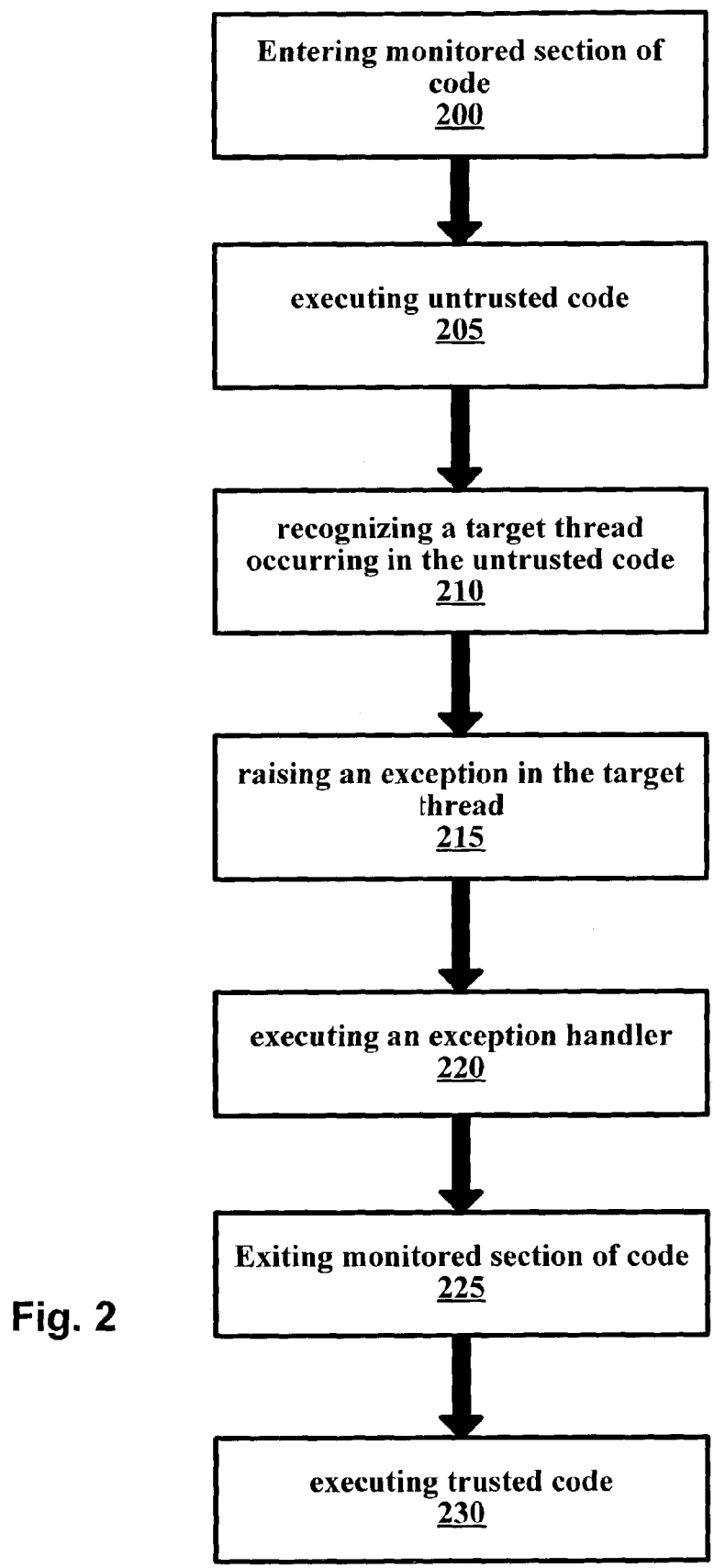
FIG. 2 is a flowchart of an exemplary method of generating an exception in untrusted code in accordance with the present invention.

FIG. 2 is a flowchart of an exemplary method of generating an exception or injecting a fault into a target thread found in untrusted code. For example, untrusted code may be code from a third party wherein the developers of the operating system or application do not have access to the third party's source code. Such third party code may be considered "untrusted" because the developers do not know the architecture and/or resulting functionality of the third party code. It is contemplated, however, that untrusted code may be any code, from any source, for which any characteristic is unknown to the application, operating system, or the developers thereof. It is also contemplated that the present invention may be used to inject a fault or an exception into any thread found in any code, untrusted or otherwise.

In a typical scenario, a processor is running "trusted" code or code associated with the application or operating system. Thereafter, at some point, a monitored section of code is entered as shown at step 200. The entry into a monitored section of code may activate monitoring software to perform monitoring functions as will be described below. The trusted code calls untrusted code and the processor begins to execute the untrusted code, as shown at step 205. For example, in one embodiment of the present invention, the untrusted code is from a display driver or a dynamic link library. However, the untrusted code may reside elsewhere without departing from the scope of the invention.

While the processor is executing instructions from the untrusted code, a target thread, or one that requires an injection of a fault or exception, is recognized, as shown at step 210. In one embodiment of the present invention, monitoring software is used to recognize the target thread. In this manner, the monitoring software may use a known quantity or constraint such as time, to recognize a target thread. Specifically, the monitoring software may contain a table of predetermined times corresponding to an associated function. Then, should the time elapsed exceed the predetermined time, a trigger is activated to recognize a target thread. Any monitoring software and any manner of recognizing a target thread however may be used without departing from the scope of the present invention.

Thereafter, at step 215, an exception is raised in the target thread. However, it is not proper to randomly inject an exception into an arbitrary thread. Typically, a thread sets up an exception handler to handle exceptions that might occur within the thread. Consequently, if a new exception is randomly injected into one of these threads, the thread may not handle the exception in an appropriate way (i.e., a way that effectively recovers from the exception). Therefore, the following technique for raising an exception in a target thread is preferably employed in a controlled environment where the thread "knows" that an exception may be injected therein. In one embodiment, the environment would be controlled by having the thread perform an operation indicating it has entered a region of code where it expects an injected exception may be injected therein. However, other control methods may be used without departing from the scope of the present invention.

Figure 3:
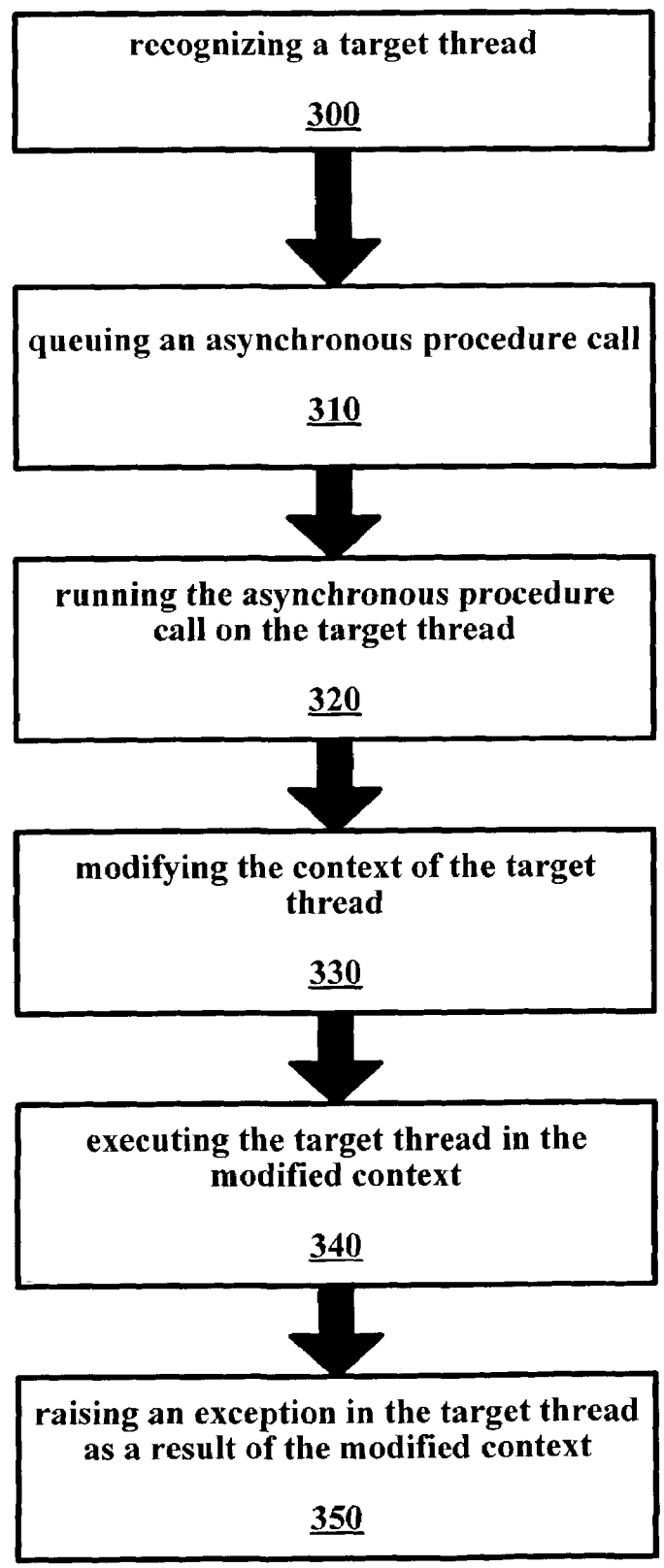
FIG. 3 shows a flowchart of an exemplary method for raising an exception in a target thread in accordance with the present invention.

In one embodiment of the invention, an exception is raised in a target thread using the method as shown in FIG. 3. First, once a target thread is recognized at step 300, an asynchronous procedure call ("APC") is queued, as shown in step 310. An asynchronous procedure call is a function that executes asynchronously in the context of a particular thread. Typically, when an APC is queued to a thread, the system issues a software interrupt. APCs generated by the system are called "kernel-mode APCs" while APCs generated by an application are called "user-mode APCs." Either kernel-mode or user-mode APCs may be used without departing from the scope of the present invention.

Once the APC is queued, the APC runs on the target thread as shown at step 320. Typically, the APC runs on the target thread the next time the thread is scheduled. However, other scheduling schemes may be used without departing from the scope of the present invention.

Thereafter, the context of the target thread is modified as shown in step 330. The mechanics for modifying the target thread varies from processor to processor. Consequently, various ways of modifying the context of the target thread may be used without departing from the scope of the present invention. For example, using the Intel Pentium (x86) processor architecture, the context of the target thread may be modified by changing the instruction pointer associated with the target thread, and making it point to a simple function that will raise an exception. In order for the stack to unwind properly (and effectively raise the exception in the target thread), the function should preferably appear as if it was called by the target thread itself.

Once the context of the target thread is modified, the target thread is executed in the modified context, as shown at step 340, and an exception is raised in the target thread as a result of executing the thread in the modified context, as shown in step 350.

Turning again to FIG. 2, once the exception is raised (e.g., at step 350), an exception handler is executed at step 220. In this manner, the handler may treat the exception in a manner that properly unwinds the stack. Once the stack is properly unwound, the monitored section of code is exited at step 225. In one embodiment of the invention, once the monitored section of code is exited the monitoring software is deactivated to save processing power. The processor may continue to execute the trusted code, as shown in step 230. In one embodiment of the present invention, a structured exception handler may be used.

Figure 4:
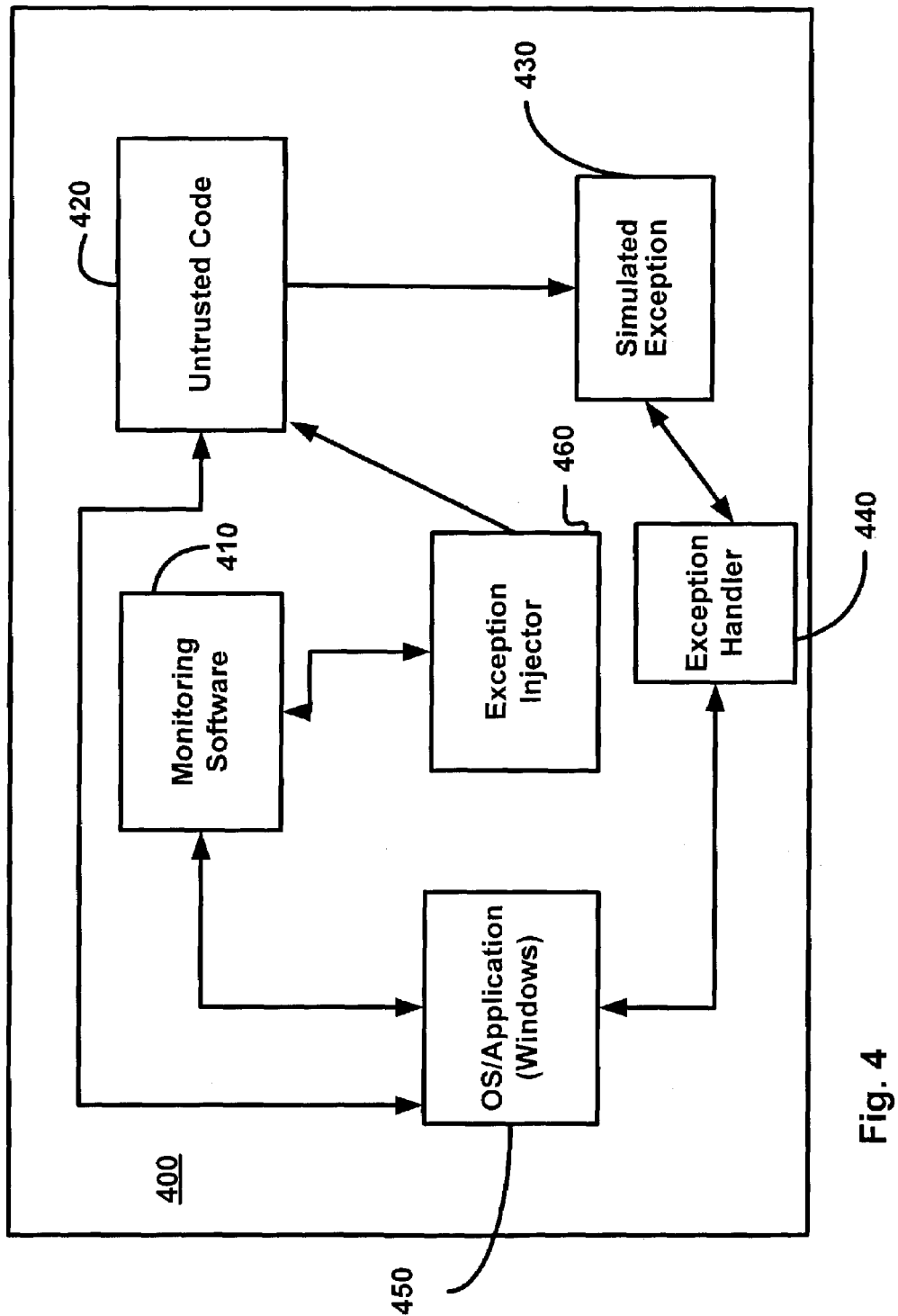
FIG. 4 is a high level block diagram showing an exemplary system adapted to perform methods in accordance with the present invention.

FIG. 4 shows an exemplary system 400 for injecting an exception into any target thread. System 400 includes monitoring software 410 in communication with an operating system or application program 450 and an exception injector 460. The system may also include untrusted code 420, a resulting simulated exception 430 and an exception handler 440.

System 400 includes an operating system or applications program 450 executing thereon. Operating system or application program 450 is in communication with monitoring software 410, an exception handler 440 and an untrusted code 420. Operating system can be any operating system without departing from the scope of the present invention. Likewise, any application program may be used in accordance with the principles of the present invention without departing from the scope thereof.

At any point during the execution of the operating system or application program code, a call to untrusted code 420 may be performed and the untrusted code is executed. As shown, untrusted code 420 resides within system 400, however, untrusted code may reside elsewhere. For example, untrusted code may be found remotely, for example, on the Internet or in memory or a dynamic link library residing elsewhere.

As shown in FIG. 4, system 400 includes a monitoring mechanism such as monitoring software 410. Asynchronously to the execution of the thread running the third party code is monitoring software 410. Once the untrusted code is executed or once the monitored section of code is entered, such software may use any methods for detecting a target thread therein. When the monitoring software 410 decides, for whatever reason, to inject an exception into the target thread 420, it proceeds to raise an exception in the target thread. This is represented by block 430. In one embodiment of the present invention, the method for injecting an exception into a target thread as shown in FIG. 3 may be used.

For example, the monitoring software 410 may employ a timeout technique that detects a target thread based on the expiration of a specific time parameter in relation to a call to untrusted code. Consequently, if the call to the untrusted code does not return in a specified time, an exception injector 460 triggers a special "THREAD_STUCK" exception. For example, a source sample is

```
_try {
    CallTo3dParty( )
} _except(GetExceptionCode( ) == SE_THREAD_STUCK) {
    HandleStuckThreadException( );
}
```

The exception injector 460 modifies the target thread state such that it appears that it made a function call that raises a system exception within the untrusted code.

```
VOID RaiseExceptionInThread( )
{
ExRaiseStatus(SE_THREAD_STUCK);
}
```

System 400 also contains an exception handler 440 to handle the injected exception 430. Preferably, exception handler 440 performs structured exception handling. In structured exception handling, blocks of code are encapsulated, with each block having one or more associated handlers. Each handler specifies some form of filter condition on the type of exception it handles. When an exception is raised by code in a protected block, the set of corresponding handlers is searched in order, and the first one with a matching filter condition is executed. Other exception handling techniques, however, may be used without departing from the scope of the invention.

In one embodiment of the invention, a structured exception handler may be a _try/_catch envelope that surrounds calls to untrusted code into _try_except brackets that allows catching and handling special "THREAD_STUCK" exception. When the code in block 420 continues to run, after having the fault injected, the standard OS structured exception handling mechanisms will kick in, and the thread will be rolled back to the appropriate exception handler represented by block 440. In other words, once the exception is injected into the target thread in the untrusted code 420, the exception handling code can take appropriate action and properly unwind the stack. Consequently, continued proper execution of the operating system 450 or application program code may continue without significant disruption to the user.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for generating an exception in untrusted code comprising:
    executing untrusted code;
    recognizing a target thread executing in the untrusted code;
    raising an exception in the target thread; and
    executing an exception handler responsive to the exception.

2. The method of claim 1, wherein raising an exception in the target thread comprises:
    queuing an asynchronous procedure call;
    running the asynchronous procedure call on the target thread;

modifying the context of the target thread;
executing the target thread in the modified context; and
raising an exception in the target thread as a result of the modified context.

3. The method of claim 1, wherein recognizing a target thread comprises recognizing a target thread using monitoring software.

4. The method of claim 2, wherein modifying the context of the target thread comprises modifying an instruction pointer for the target thread.

5. The method of claim 1, wherein recognizing a target thread executing in the untrusted code comprises recognizing a target thread executing in a display driver.

6. The method of claim 1, wherein recognizing a target thread executing in the untrusted code comprises recognizing a target thread executing in a dynamic link library.

7. The method of claim 1, wherein recognizing a target thread comprises recognizing a spinning thread.

8. The method of claim 1, wherein recognizing a target thread comprises recognizing a target thread based on a violation of a constraint.

9. A method for raising an exception in a target thread comprising:
recognizing a target thread;
queuing an asynchronous procedure call;
running the asynchronous procedure call on the target thread;
modifying the context of the target thread;
executing the target thread in the modified context; and
raising an exception in the target thread as a result of the modified context.

10. The method of claim 9, wherein recognizing a target thread comprises recognizing a target thread using monitoring software.

11. The method of claim 9, wherein modifying the context of the target thread comprises modifying the instruction pointer for the target thread.

12. The method of claim 9, wherein recognizing a target thread comprises recognizing a target thread executing in a display driver.

13. The method of claim 9, wherein recognizing a target thread comprises recognizing a target thread executing in a dynamic link library.

14. The method of claim 9, wherein recognizing a target thread comprises recognizing a spinning thread.

15. The method of claim 9, wherein recognizing a target thread comprises recognizing a target thread based on a violation of a constraint.

16. A computer-readable storage medium having at least one physical media comprising computer-executable instructions to perform a method of generating an exception in untrusted code, the method comprising:
executing untrusted code;
recognizing a target thread executing in the untrusted code;
raising an exception in the target thread;
executing an exception handler; and
executing trusted code.

17. The computer readable medium of claim 16, further comprising computer-executable instructions to perform the steps of:
queuing an asynchronous procedure call;
running the asynchronous procedure call on the target thread;
modifying the context of the target thread;
executing the target thread in the modified context; and
raising an exception in the target thread as a result of the modified context.

18. The computer readable medium of claim 16, further comprising computer-executable instructions to perform the step of:
recognizing a target thread comprises recognizing a target thread using monitoring software.

19. The computer readable medium of claim 16, wherein modifying the context of the target thread comprises modifying an instruction pointer for the target thread.

20. The computer readable medium of claim 16, wherein recognizing a target thread executing in the untrusted code comprises recognizing a target thread executing in a display driver.

21. The computer readable medium of claim 16, wherein recognizing a target thread executing in the untrusted code comprises recognizing a target thread executing in a dynamic link library.

22. The computer readable medium of claim 16, wherein recognizing a target thread executing in the untrusted code comprises recognizing a spinning thread executing in the untrusted code.

23. The computer readable medium of claim 16, wherein recognizing a target thread comprises recognizing a target thread based on a violation of a constraint.

24. A computer readable storage medium having at least one physical media comprising computer-executable instructions to perform a method of raising an exception in a target thread, the method comprising:
recognizing a target thread;
queuing an asynchronous procedure call;
running the asynchronous procedure call on the target thread;
modifying the context of the target thread;
executing the target thread in the modified context; and
raising an exception in the target thread as a result of the modified context.

25. The computer readable medium of claim 24, wherein recognizing a target thread comprises recognizing a target thread using monitoring software.

26. The computer readable medium of claim 24, wherein modifying the context of the target thread comprises modifying the instruction pointer for the target thread.

27. The computer readable medium of claim 24, wherein recognizing a target thread comprises recognizing a target thread executing in a display driver.

28. The computer readable medium of claim 24, wherein recognizing a target thread comprises recognizing a target thread executing in a dynamic link library.

29. The computer readable medium of claim 24, wherein recognizing a target thread comprises recognizing a spinning thread.

30. The computer readable medium of claim 24, wherein recognizing a target thread comprises recognizing a target thread based on a violation of a constraint.

31. A system implemented at least in part by a computing device for injecting an exception into a target thread comprising:
a first module for executing trusted and untrusted code;
a second module for monitoring the execution of the trusted and untrusted code and for recognizing a target thread executing therein;
a third module for injecting an exception into the target thread; and
a fourth module for handling the injected exception in the target thread.

32. The system of claim 31, wherein the third module comprises a module for queuing an asynchronous procedure call, running the asynchronous procedure call on the target thread, modifying the context of the target thread, executing the target thread in the modified context, and raising an exception in the target thread as a result of the modified context.

33. A system for injecting an exception into a target thread comprising:
    a storage device comprising untrusted and trusted code;
    a processor for executing the trusted and untrusted code from the storage device;
    an exception injector in communication with the processor for injecting an exception into a target thread; and
    an exception handler for handling the injected exception in the target thread.

34. The system of claim 33, wherein the exception handler is a structured exception handler.

35. The system of claim 34 further comprising:
    monitoring software in communication with the exception injector.

* * * * *